April 18, 1961     J. B. OTTESTAD     2,980,071
DECELERATION CARRIAGE APPARATUS
Filed July 28, 1958     3 Sheets-Sheet 1

JACK BENTON OTTESTAD,
INVENTOR.

BY
ATTORNEY.

April 18, 1961 J. B. OTTESTAD 2,980,071
DECELERATION CARRIAGE APPARATUS
Filed July 28, 1958 3 Sheets-Sheet 2
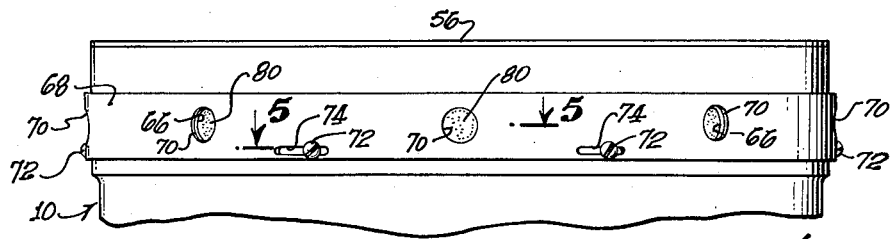
Fig. 4.
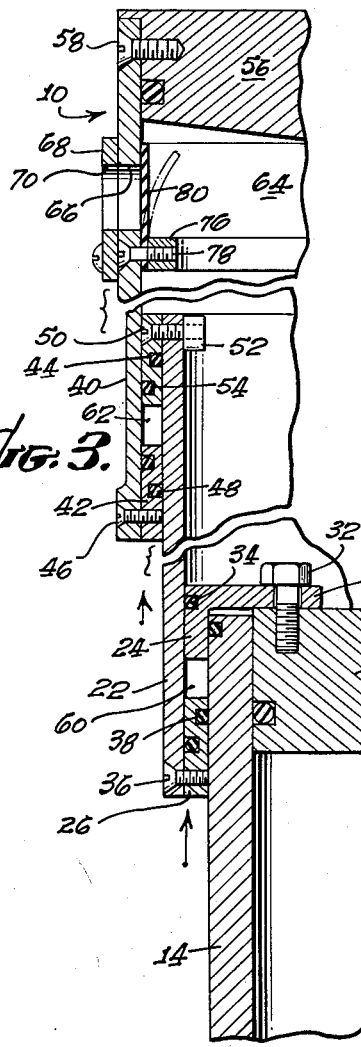
Fig. 3.
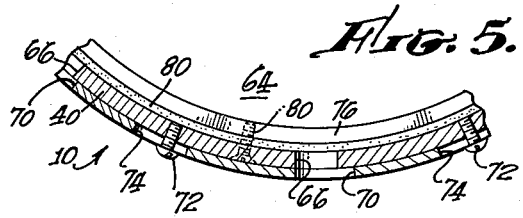
Fig. 5.
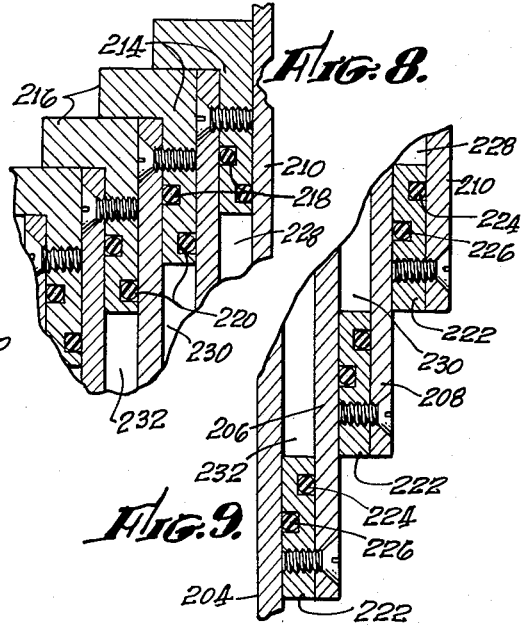
Fig. 8.
Fig. 9.
JACK BENTON OTTESTAD,
INVENTOR.
BY
ATTORNEY.

April 18, 1961 J. B. OTTESTAD 2,980,071
DECELERATION CARRIAGE APPARATUS
Filed July 28, 1958 3 Sheets-Sheet 3

JACK BENTON OTTESTAD,
INVENTOR.

BY
ATTORNEY.

United States Patent Office 2,980,071
Patented Apr. 18, 1961

2,980,071

DECELERATION CARRIAGE APPARATUS

Jack B. Ottestad, Claremont, Calif., assignor to General Dynamics Corporation, San Diego, Calif., a corporation of Delaware Filed July 28, 1958, Ser. No. 751,446

11 Claims. (Cl. 121—46)

This invention relates generally to an apparatus for decelerating a moving body; more particularly, it relates to a deceleration apparatus wherein decelerating forces are produced by pressure changes effected within the apparatus by movement thereof.

Although the deceleration apparatus of the present invention may be utilized in many applications, it is particularly well adapted for the deceleration of high-velocity carriages, work platforms or platens, such as are utilized in the testing of electronic equipment or the like to determine their performance and reliability under conditions of acceleration or shock. In such applications, a platform or carriage bearing an object under test is subjected to high acceleration and it is desired that deceleration be effected within a relatively short distance in order to minimize the length of the test structure.

Heretofore, devices for accomplishing such deceleration have been characterized by certain defects and shortcomings. Typical examples of prior art devices are collapsed lead blocks, stretched steel traps, hydraulic shock absorbers and frictional braking devices. Such devices have generally been relatively complex, cumbersom, unwieldy and expensive. The deceleration provided by certain of these devices is destructively abrupt. These devices have generally been incapable of adjustment to provide a selected deceleration-time pattern and and they have not generally been capable of precise repetition of a selected deceleration-time pattern. Moreover, the decelerating forces have not been applied symmetrically so as to balance the forces on the platform or carriage. Further, directional guidance of the platform or carriage has required additional structure or apparatus separate from the deceleration apparatus itself.

The present invention utilizes telescoping stage members which cooperate with other parts of the apparatus to define a chamber which is expansible by movement of a stage. A coaxial chamber is defined between each pair of stage members by annular spacers. When the stages are accelerated, the movement reduces the pressure in the expansible chamber and increases the pressure in the coaxial chambers. Each of these pressure changes produces a separate decelerating force on the moving stage. The partial vacuum produced in the expansible chamber causes deceleration. The increased pressure in the coaxial chamber exerts decelerating force on the spacer attached to the moving stage. Each successive stage of a plurality of stages is put in motion and accelerated by the action of pressure in a coaxial chamber on a spacer attached to the stage. The sizes of openings in the expansible chamber may be adjusted to regulate admission of air to provide a controlled deceleration-time pattern.

Actuator means may be utilized with the present invention to provide rapid controlled acceleration. The preferred embodiments described herein are operatively associated with actuators of the types described and claimed in the copending application of Jack B. Ottestad, Serial No. 617,014, filed October 19, 1957, and in the copending application of Jack B. Ottestad and Samuel Arthur Skeen, Serial No. 683,855, filed September 13, 1957, now Patent No. 2,949,096.

It is an object of the present invention to provide a deceleration apparatus wherein decelerating forces are produced by pressure changes effected within the apparatus by movement thereof.

An object of this invention is the provision of a deceleration apparatus characterized by simplicity of construction, compactness, and ease of operation.

It is an object of this invention to provide a novel deceleration apparatus which is adapted to retard a moving body in a manner characterized by a predetermined and controlled deceleration-time pattern.

An object of the present invention is to provide a deceleration device wherein decelerating forces are produced by compression between telescoping stage members.

It is an object of this invention to provide a decelerating device wherein a decelerating force is effected by a partial vacuum in a pressure chamber which is expanded by the movement being decelerated.

It is an object of the present invention to provide a deceleration apparatus which inherently provides guidance for a moving carriage or platform without requiring separate guide means.

It is another object of this invention to provide a novel deceleration apparatus wherein decelerating forces are applied symmetrically to a moving member.

Another object of this invention is a provision of a deceleration apparatus which decelerates without subjecting elements of the apparatus or the object being decelerated to physical impact.

Other objects and features of the present invention, as well as many advantages thereof, will become apparent to those skilled in the art from a consideration of the following description, the appended claims and the accompanying drawings, wherein:

Figure 3 is a fragmentary sectional view showing details of certain elements of the apparatus shown in Figure 1;

Figure 4 is a fragmentary elevational view showing an adjustment ring utilized with the present invention;

Figure 5 is a sectional view taken at line 5—5 of Figure 4;

Figure 8 and 9 are fragmentary sectional views showing details of certain elements of the deceleration apparatus shown in Figure 6.

Figure 1:
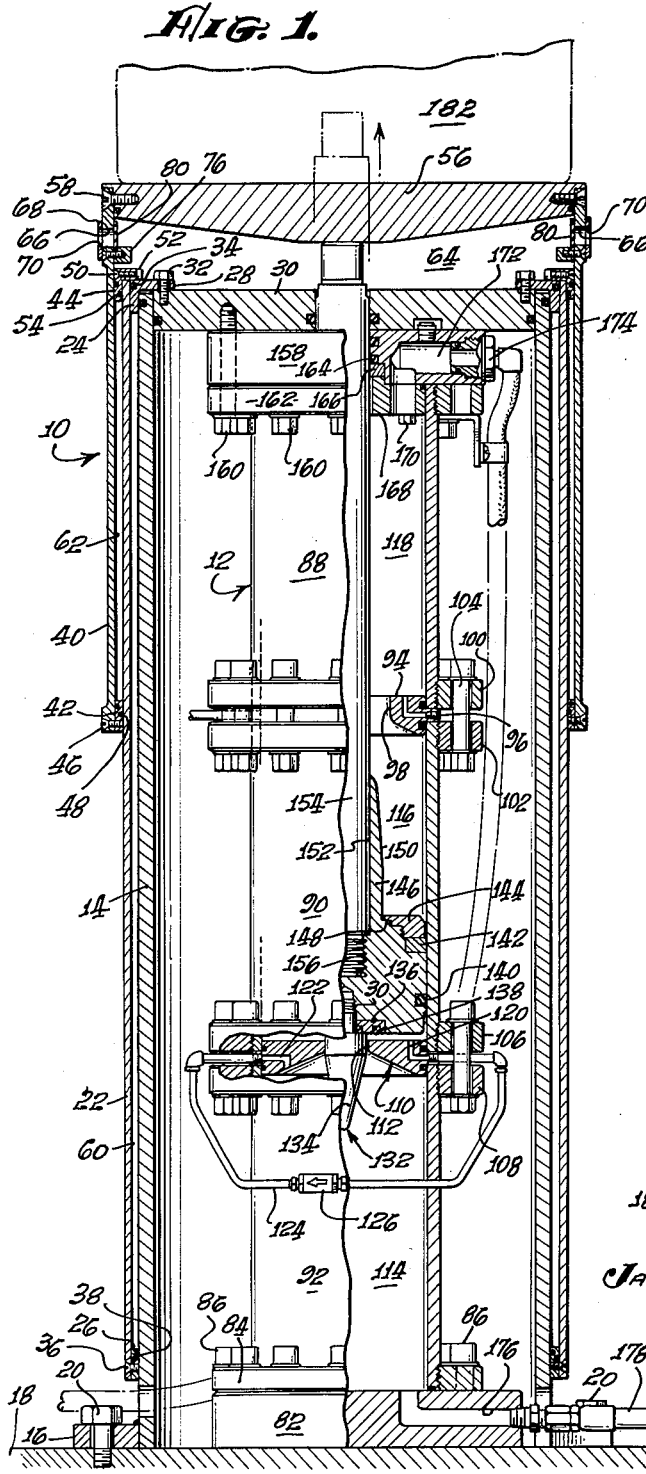
Figure 1 is an elevational view, partially in section, of a deceleration apparatus of the present invention in operating relationship with an actuator.
Figure 2:
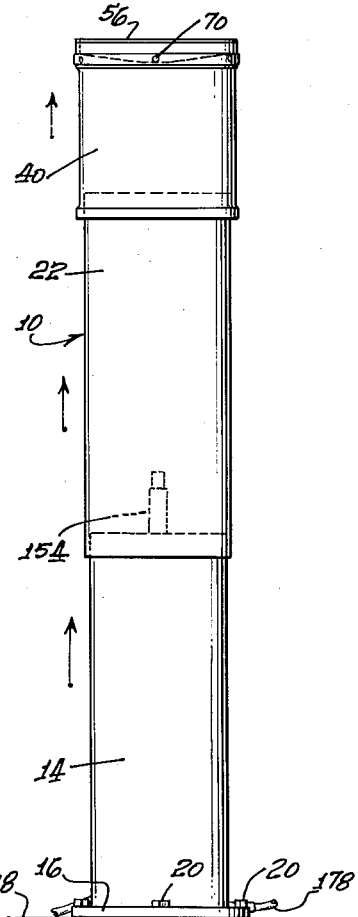
Figure 2 is an elevational view showing the deceleration apparatus of Figure 1 extended during operation.

Referring to the drawings, and particularly to Figures 1, 2, and 3, a deceleration carriage assembly 10 of the present invention is shown in operative relation with an actuator 12. A guide cylinder or stationary cylindrical stage 14 is welded to a mounting ring 16 which is secured to a foundation 18 by belts 20. A cylindrical carriage stage 22 is disposed coaxially about the guide cylinder and is spaced therefrom by annular spacers 24 and 26 disposed at respective ends of the cylindrical stage, as shown in Figures 1 and 3. Spacer 24 has an inwardly extending flange portion 28 which is secured to a top plate 30 by screws 32. An annular resilient seal 34 in an appropriate groove in the spacer provides pressure sealing between spacer 24 and stage 22. A similar seal positioned in a groove in guide cylinder 14 provides sealing between the cylinder and spacer 24. Annular spacer 26 is secured to the opposite end of cylindrical stage 22 by screws 36 and has annular grooves for a seal ring between stage 22 and the spacer and for a seal ring 38 between the spacer and guide cylinder 14.

A second cylindrical stage 40 is positioned coaxially about stage 22 and is spaced therefrom by spacers 42 and 44. Spacer 42 is secured to the lower end of stage 40 by screws 46 and has annular seals 48 to provide pressure sealing between the spacer and each of stages 22 and 40. Spacer 44 at the opposite end of stage 22 is secured thereto by screws 50, which secure nuts 52 to the interior wall of the stage for the purpose of supporting stage 22 on spacer 24 when the carriage assembly is at rest. An appropriate seal ring provides pressure sealing between stage 22 and spacer 44, and a similar ring 54 provides a pressure seal between the spacer and stage 40. A circular platform 56 is secured to the end portion of cylindrical stage 40 by screws 58 and a seal ring is provided between these members.

From the foregoing description, it will be understood that a coaxial pressure chamber 60 is defined by cylindrical stage 22, guide cylinder 14, spacers 24 and 26, and the associated seal rings. A similar coaxial chamber 62 is defined between stages 22 and 40 by the spacers therebetween. It will also be understood that a generally cylindrical expansible pressure chamber 64 is defined by top plate 30, platform 56, stage 22, stage 40, and the spacers 24 and 44.

Openings 66 are spaced circumferentially about the upper portion of cylindrical stage 40, as shown in Figure 4. An adjustment ring 68 is positioned about the stage and has openings 70 arranged to be registrable with openings 66. The adjustment ring is retained on the cylindrical stage by screws 72, which extend through slots 74 in the ring. These slots provide means for adjusting the rotational position of the ring to position openings 70 relative to openings 66 for the purpose of selecting the effective sizes of the openings.

As shown in Figures 3 and 5, a retaining ring 76 is secured by screws 78 to the interior of stage 40 and secures the lower portion of a resilient flapper valve element 80. Valve element 80 extends circumferentially about the interior of the stage and covers openings 66. The upper portion of the flapper element is movable to admit air through the openings, as shown in phantom outline in Figure 3.

Referring to Figure 1, the actuator 12 rests on a base member 82 to which it is secured by means of an internally threaded ring 84, which engages the lower end portion of the actuator housing and is secured to the base member by bolts 86. The actuator and its operation are described in the copending applications mentioned hereinbefore. They are described herein in order to relate them to the present invention. The actuator housing includes cylindrical sections 88, 90, and 92. An apertured wall member 94 has a flange portion 96 secured between the ends of sections 88 and 90. Pressure sealing is provided by resilient seal rings in appropriate grooves in the wall member on each side of flange portion 96. A contoured aperture 98 in the wall member serves a purpose which is discussed hereinafter. Internally threaded annular members 100 and 102 are provided for engagement with threaded end portions of sections 88 and 90 respectively, as shown. Spaced openings in the annular members accommodate a plurality of bolts 104 which engage appropriate nuts to secure sections 88 and 90 in alignment and to clamp flange portion 96 therebetween. Cylindrical sections 90 and 92 are similarly secured in alignment by internally threaded annular members 106 and 108, and by bolts 104. An orifice plate or wall 110 is secured by its flange portion in the same manner as wall member 94 is secured. Appropriate grooves in the orifice plate receive resilient seals for insuring pressure sealing between the plate and the cylindrical sections. A contoured orifice 112 is provided for a purpose which is hereinafter explained.

The cylindrical housing formed by sections 88, 90, and 92 may be considered as divided into pressure chambers 114, 116, and 118 by the orifice plate and by wall member 94. Passages 120 and 122 are defined in the orifice plate and communicate with chambers 116 and 114 respectively, as shown. These passages are interconnected by suitable couplings and by tubular member 124, into which is connected a unidirectional check valve 126 to permit flow in the direction indicated by the arrow thereon. It will be understood that means are thereby provided for unidirectional flow from chamber 116 to chamber 114.

A piston 128 is positioned in chamber 116 and engages a reduced threaded end portion 130 of a metering member 132, which has a contoured portion 134. An annular seal base 136 is secured in an appropriate recess in the piston and encircles the metering member. A circular resilient pressure seal 138 is secured by bonding in an appropriate groove in the seal base. An annular sealing element 140 in a peripheral groove in the piston provides pressure sealing between the piston and cylindrical section 90. A bearing ring 142, spaced axially from sealing element 140, is disposed in an appropriate recess in the piston to reduce sliding friction and to maintain alignment between the piston and cylindrical section 90. A lock ring 144 is in threaded engagement with a reduced threaded end portion of the piston. It retains bearing ring 142 and secures a deceleration metering pin 146 by means of mutually engaging flange portions 148. The deceleration metering pin has a contoured peripheral surface 150 and has an internal bore 152 adapted to fit about a thrust column 154. A threaded end portion 156 of the column engages a threaded opening in the piston. The thrust column extends through aperture 98, chamber 118 and an opening in an end member 158 of the actuator. Exterior of the actuator, the column abuts the lower surface of platform 56 when the carriage assembly is at rest, as shown in Figure 1. Bolts 160 extend through an internally threaded ring 162, which is in threaded engagement with cylindrical section 88, and through end member 158 into threaded engagement with top plate 30 to secure these parts together. An annular wiper 164 is disposed in a groove within the opening of the end member and engages the thrust column. A seal ring is disposed in a similar groove and bearing 166 is disposed in another such groove. The bearing ring and the sealing element are secured by a retaining plate 168 and bolts 170.

A passage 172 in end member 158 and a fluid connection 174 interconnect chamber 118 with a source of pressure (not shown). A similar passage 176 in base member 82 and a fluid coupling 178 interconnect a source of pressure (not shown) with chamber 114.

In operation, the actuator is capable of imparting very high acceleration to the platform 56. A setting pressure is first introduced into chambers 116 and 118 of the actuator through passage 172 and fluid connection 174. The setting pressure acts upon the area of piston 128 about thrust column 154 and urges the piston against orifice plate 110. This compresses circular resilient seal 138 against the surface of the orifice plate to effect a positive pressure seal which isolates chamber 116 from chamber 114. A second and higher pressure is established in chamber 114 through passage 176 and coupling 178. This pressure acts upon the area of metering member 132 and piston 128 within the seal 138, and is sufficient to balance the force of the pressure acting upon the larger area at the opposite end of the piston. The piston is thus held in a state of equilibrium. The pressure in chamber 114 is then increased to a firing pressure sufficient to unbalance the forces upon the piston and cause it to move from the orifice plate. As more fully described in the copending applications identified above, this disengages seal 138 and releases the high firing pressure substantially instantaneously upon the annular area of piston 128 outside circular seal 138. A great net force is thereby suddenly applied to the piston to impel it from the orifice plate with extremely high acceleration. The force and acceleration developed on the piston and thrust column 154 are functions of the pressures in chambers 114 and 116, the piston and thrust column masses, the area of the piston about the thrust column and the area encompassed by circular seal 138.

When seal 138 is disengaged and the piston is in motion, the pressurized gas must flow through a net orifice area governed by metering member 132. The net pressure on the piston and the accelerating force thereon therefore vary in accordance with this net flow area between the orifice and the metering member. The metering member is contoured along its length to control the acceleration-time pattern of the thrust column 154, and as the piston moves from the orifice plate, the net flow area is varied in accordance with piston position. A pressure drop is produced across the orifice which is a function of the net effective orifice area. Variation of this net area by the moving metering member therefore controls the variation in force and acceleration on the piston and thrust column. Upon completion of the acceleration phase, the deceleration metering pin 146 coacts with aperture 98 of wall member 94, to effect a predetermined piston deceleration pattern, in the manner described in the copending applications.

From the foregoing, it will be understood that a selected acceleration-time or thrust-time pattern may be produced by an appropriately contoured metering member. The manner of determining the contouring of metering members to produce selected outputs is set forth in the copending applications.

The thrust column 154 transmits thrust and acceleration to the platform 56 and impels it upward at a high rate of acceleration. At the end of the thrust column's stroke the platform loses contact with the column and moves beyond it. The cylindrical stage 40 and cylindrical stage 22 are extended in a telescoping manner, as indicated in Figure 2.

Movement of the stages produces decelerating forces on the stages. As stage 40 moves upward under the acceleration imparted by the actuator, the length of coaxial pressure chamber 62 is reduced and the pressure therein is correspondingly increased. This pressure exerts a decelerating force on spacer 42. The pressure increases with movement until it is sufficient to move stage 22 by acting on the annular surface of spacer 44, which is attached to the stage. Relatively smooth acceleration of stage 22 is thus effected. Stage 22 is accelerated along the stationary stage or guide cylinder 14 by this action of the pressure in chamber 62 upon spacer 44. The movement increases the pressure in coaxial chamber 60 so that a correspondingly increasing decelerating force is exerted on spacer 26 and on stage 22 to which this spacer is secured.

From the foregoing description, it will be understood that relatively smooth initiation and acceleration of the movement of a successive stage or stages is accomplished by means of pressure changes in coaxial chambers between the stages. It will be understood that decelerating force is exerted on each successive stage by pressure increase in the coaxial chambers. It will be further understood that decelerating force is applied relatively smoothly to a telescoping stage without physical impact between members, despite the very rapid acceleration and movement of the stages.

Decelerating force results from the production of a partial vacuum in pressure chamber 64. As hereinbefore described, expansible chamber 64 is defined by platform 56, top plate 30, the cylindrical stages and the spacers. Upward movement of the platform and telescoping extension of the stages expands the chamber and produces a partial vacuum. The partial vacuum results in the exertion of downward decelerating force by the greater pressure of the exterior atmosphere. It will be understood that considerable decelerating force is thus produced and is applied smoothly without impact between members.

The deceleration-time pattern of the platform and the carriage may be governed by means of the adjustment ring 68. Referring to Figures 3 and 4, there are shown details of this ring and the manner of its mounting relative to openings 66 in stage 40. Screws 72 are loosened to permit adjustment of the rotational position of ring 68 in order to select the effective size of the openings by selection of the positions of ring openings 70 relative to openings 66. By thus governing the rate of admission of air during the rapid upward movement of stage 40, the deceleration-time pattern is controlled.

The decelerating forces effect cessation of platform movement when the cylindrical stages have been telescopically extended to the configuration shown in Figure 2. The platform and stages are stopped by the action of pressure changes within the apparatus of this invention without the necessity of impact between members.

After upward movement of the carriage, flapper valve element 80 prevents loss of pressure from chamber 64 through openings 66 during downward movement. Valve element 80 permits air to enter through the openings during upward movement. Retention of pressure in the chamber cushions the fall of the stages and prevents shock and damage. After downward movement is completed, the valve element permits pressure to escape slowly from chamber 64.

Although the apparatus described herein utilizes both coaxial chambers between stages and an expansible chamber for developing decelerating forces, it is to be understood that each of the two means for producing such forces may be utilized separately and that the two means need not be utilized together.

Figures 6, 7:
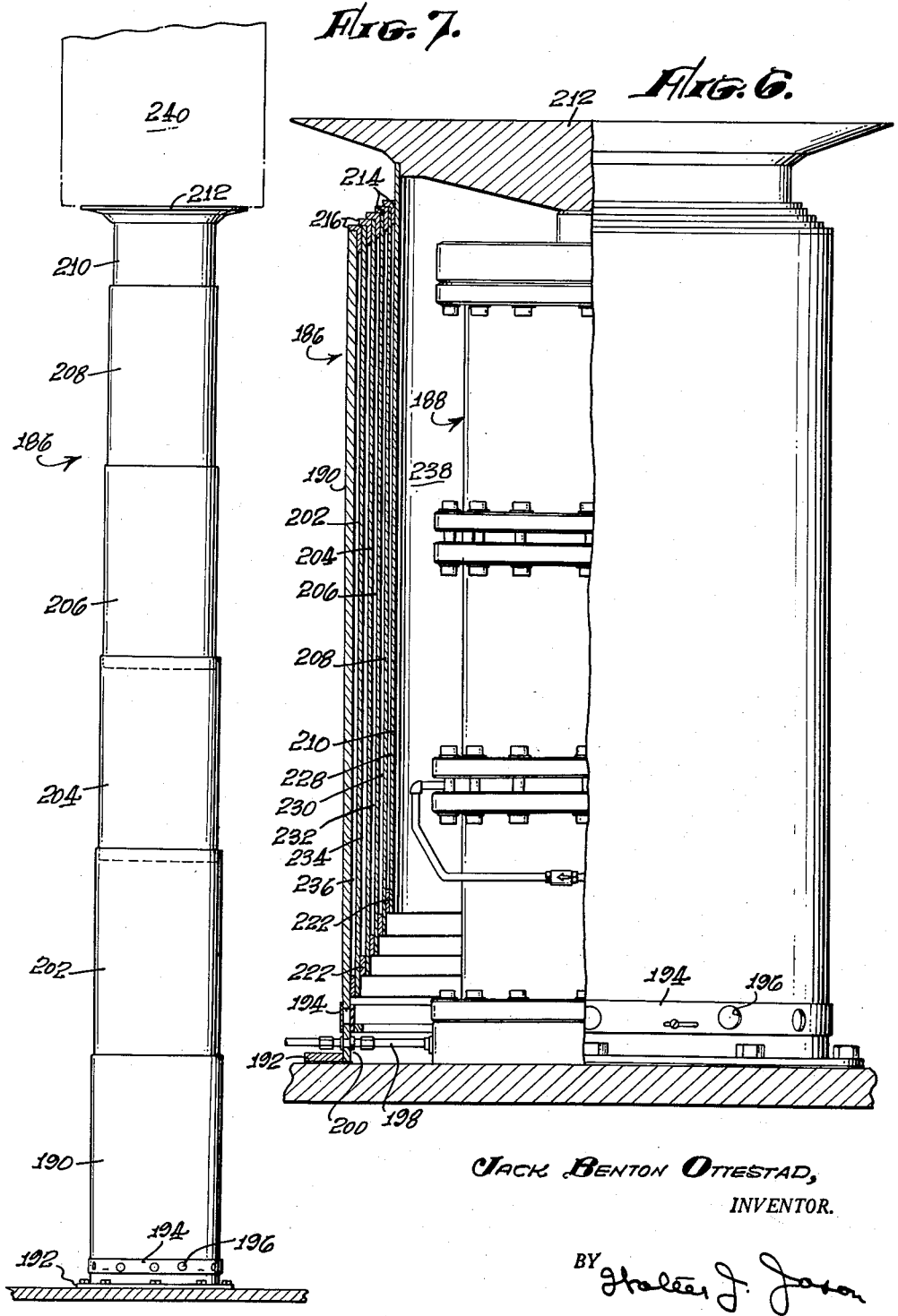
Figure 6 is an elevational view, partially in section, of a modified form of deceleration apparatus according to the present invention in operating relationship with an actuator.
Figure 7 is an elevational view showing the deceleration apparatus of Figure 6 extended during operation.

In Figures 6 and 7 there is shown a modified form of deceleration carriage apparatus according to the present invention. A deceleration carriage 186 is mounted in operative relation with an actuator 188, this actuator being similar to the actuator of Figure 1. A guide cylinder 190 is secured by a mounting ring 192 to a foundation, the structure being similar to that of the corresponding parts of the apparatus shown in Figure 1. An adjustment ring 194, similar in construction and function to ring 68 of Figures 4 and 5, is disposed about holes 196 in the lower part of the guide cylinder.

The actuator is interconnected with a source of actuating pressure (not shown) by a fluid coupling 198, which extends through a pressure fitting 200 in guide cylinder 190. A similar pressure fitting accommodates a second coupling (not shown) which connects the actuator with a source of setting pressure.

Five telescoping cylindrical stages, 202, 204, 206, 208, and 210, are arranged in coaxial relation within the guide cylinder. The upper end of the innermost stage 210 is attached by welding to a platform 212 which abuts the thrust column of the actuator when the telescoping carriage is at rest, as shown in Figure 6. As illustrated in Figure 8, an annular spacer 214 is secured by screws to the upper end of the guide cylinder and to the upper end of each cylindrical stage except stage 210. Each of the identical spacers 214 has a flange portion 216 which supports its respective stage when the carriage assembly is at rest in the configuration shown in Figures 6 and 8. A seal ring 218 in each spacer provides pressure sealing between the spacer and the stage to which it is secured. A similar seal ring 220 provides a movable pressure seal between its associated spacer and the adjacent stage relative to which it is slidable. At the lower end of each stage an annular spacer 222 is secured. As illustrated in Figure 9, a ring seal 224 in an appropriate groove in each of the spacers 222 provides pressure sealing between the spacer and the stage to which it is attached. A similar seal 226 on the opposite side of each spacer 222 constitutes a movable pressure seal between the spacer and the adjacent stage relative to which the spacer is slidable.

From the foregoing description, it will be understood that a coaxial pressure chamber is defined between each pair of adjacent cylindrical stages. Like chamber 62 of the embodiment shown in Figure 1, each of chambers 228, 230, 232, 234 and 236 is defined between two adjacent stages by the spacers and seal rings between the stages. It will also be understood that an expansible pressure chamber 238 is defined within the assembly by the cylindrical stages, the spacers, the guide cylinder, platform 212 and the foundation.

This embodiment differs from the embodiment shown in Figure 1 in certain respects. The innermost cylindrical stage is secured to the platform, and the stationary stage or guide cylinder is disposed outwardly of the cylindrical stages. Five movable stages are utilized instead of the two stages of the apparatus of Figure 1. Chamber 238 is defined by the entire interior of the apparatus, whereas the corresponding chamber 64 in Figure 1 is defined by the upper portion of the apparatus.

Although the operation of the embodiment of Figures 6 and 7 is generally like that of the apparatus of Figure 1, it differs in certain respects. Pressures built up in coaxial chambers between cylindrical stages serve to accelerate successive stages and to produce deceleration forces on the stages. A partial vacuum produced in chamber 238 also produces deceleration force. In the apparatus of Figure 6, the innermost stage is the first to move when the platform is accelerated, and the stages are accelerated in sequence from the innermost to the outermost, whereas in the embodiment of Figure 1 the sequence is from the outermost to the innermost. Guidance is provided by the outer guide cylinder 199 instead of an inner guide cylinder.

A specimen 240 on platform 212 may be subjected to a desired acceleration-time pattern and decelerated in the general manner hereinbefore described in relation to the embodiment shown in Figure 1. It will be appreciated that the greater number of stages of this embodiment provides a longer telescoping extension than is obtainable with the embodiment of Figure 1. It will be understood that the larger pressure chamber 238 tends to effect a more gradual application of decelerating force than the smaller pressure chamber 64 of Figure 1.

From the foregoing discussion, it will be realized that the present invention achieves the objects set forth hereinabove. The telescoping carriage and platform are smoothly decelerated. Relatively smooth acceleration of successive telescoping stages provides gradual transition between stages. The deceleration may be adjusted and controlled to retard a moving body in a manner characterized by a predetermined and controlled deceleration-time pattern. The telescoping construction provides guidance for the carriage and platform without separate guiding apparatus. The deceleration apparatus is relatively simple in construction, compact, and convenient to operate. Deceleration forces are applied to moving members in a symmetrical manner because the decelerating pressures are applied over annular or circular areas.

Although specific embodiments of the present invention have been described and illustrated in detail, it is to be clearly understood that the same are by way of illustration and example only; it is to be understood that the invention is not limited thereto, as many variations will be readily apparent to those versed in the art and the invention is to be given its broadest possible interpretation within the terms of the appended claims.

The inventor claims:

1. A deceleration apparatus comprising a first stage, a second stage in telescoping relation with the first stage, and a pair of spacers axially spaced between said stages and cooperating therewith to define a closed pneumatic pressure chamber therebetween, one of said spacers being attached to said first stage, actuating means connected with the first stage to rapidly accelerate and extend the first stage relative to the second stage, whereby said relative extension between the stages increases the pressure in said pneumatic chamber to produce a decelerating force on the first stage.

2. A deceleration apparatus comprising platform means, a first cylindrical stage attached to the platform means, actuating means for rapidly accelerating and extending said platform means and first stage, a second cylindrical stage in telescoping relation with the first stage, and a pair of axially spaced spacer rings between said stages and cooperating therewith to define a closed coaxial pneumatic pressure chamber, one of said spacer rings being attached to each of the cylindrical stages, whereby movement of the first stage reduces the axial distance between said spacer rings and increases the pressure in said pneumatic chamber to exert decelerating force on the spacer ring attached to the first stage.

3. A deceleration device comprising a first stage, a second stage telescopingly receiving the first stage, means cooperating with the first stage to define an expansible pneumatic chamber, actuating means connected with the first stage to rapidly accelerate and extend the first stage relative to the second stage, said rapid extension of said first stage expanding said chamber to reduce the pressure therein to exert decelerating force on said first stage, and means defining at least one opening in the first stage for admission of air during said extension to regulate said decelerating force.

4. A deceleration device comprising a first stage, a second stage telescopingly receiving the first stage, means cooperating with the first stage to define an expansible pneumatic chamber, actuating means connected with the first stage to rapidly accelerate and extend the first stage relative to the second stage, said rapid extension of said first stage expanding said chamber to reduce the pressure therein to exert decelerating force on said first stage, means defining at least one opening in the first stage for admission of air during said extension to regulate said decelerating force, and valve means cooperating with said opening for retaining pressure in said chamber during contraction thereof to govern the rate of said contraction.

5. A deceleration device comprising guide means, a stage member slidably mounted relative to said guide means, means cooperating with the stage and the guide means to define an expansible pneumatic pressure chamber, and actuating means connected with the stage for rapidly accelerating and extending said stage, said chamber being expanded upon the extension of said stage to reduce the pressure therein to exert a decelerating force on said stage.

6. An actuating apparatus comprising a first stage member, a second stage member in telescoping relation with said first stage, cylinder means, an actuator piston in said cylinder means, a thrust column connected with said actuator piston and positioned to move said first stage, a plate confronting said actuator piston and defining an orifice, sealing means disposed between the actuator piston and the plate for effecting pressure sealing therebetween about the orifice, means for exerting a setting force urging said actuator piston toward the plate to cover the orifice and effect said pressure sealing, and means for establishing an actuating pressure to act upon a portion of the actuator piston within the sealing means to overbalance the setting force and expose an increased area of the actuator piston to said actuating pressure, thereby accelerating said thrust column and said first stage, and spacer means disposed between said stage members to cooperate therewith to define a pressure chamber therebetween, one of said spacer means being attached to each of the stage members, whereby decelerating force is exerted on said first stage upon movement thereof to increase pressure in said chamber.

7. A deceleration apparatus comprising a first stage member, a second stage in telescoping relation with the first stage, a pair of spacers axially spaced between said stages and cooperating therewith to define a coaxial pressure chamber therebetween, one of said spacers being attached to said first stage, and means cooperating with said first stage to define an expansible chamber, and actuating means for rapidly accelerating and extending the first stage, whereby relative movement between the stages increases the pressure in said coaxial chamber and enlarges the expansible chamber to reduce the pressure therein, thereby decelerating said first stage.

8. An actuating apparatus comprising a first stage member, a second stage member in telescoping relation with said first stage, cylinder means, an actuator piston in said cylinder means, a thrust column connected with said actuator piston and positioned to move said first stage, a plate confronting said actuator piston and defining an orifice, sealing means disposed between the actuator piston and the plate for effecting pressure sealing therebetween about the orifice, means for exerting a setting force urging said actuator piston toward the plate to cover the orifice and effect said pressure sealing, and means for establishing an actuating pressure to act upon a portion of the actuator piston within the sealing means to overbalance the setting force and expose an increased area of the actuator piston to said actuating pressure, thereby accelerating said thrust column and said first stage, and means cooperating with said stage members to define an expansible chamber, said chamber being expansible upon movement of said stage to reduce the pressure therein and produce decelerating force on said stage.

9. A deceleration apparatus comprising a first stage, a second stage in telescoping relation with the first stage, a spacer ring attached to each of said stages, said spacer rings maintaining said stages in spaced relation and cooperating therewith to define a closed coaxial pneumatic pressure chamber therebetween, platform means associated with said first stage, means cooperating with the first stage to define an expansible pneumatic pressure chamber, and actuating means connected with said platform means for accelerating and extending said first stage, whereby extension of the first stage increases the pressure in said coaxial chamber and enlarges said expansible chamber to reduce the pressure therein, whereby decelerating forces are exerted on said first stage by pressure in said coaxial pressure chamber and by production of a partial vacuum in said expansible chamber.

10. An actuating apparatus comprising a first stage member, a second stage member in telescoping relation with said first stage, cylinder means, an actuator piston in said cylinder means, a thrust column connected with said actuator piston and positioned to move said first stage, a plate confronting said actuator piston and defining an orifice, sealing means disposed between the actuator piston and the plate for effecting pressure sealing therebetween about the orifice, means for exerting a setting force urging said actuator piston toward the plate to cover the orifice and effect said pressure sealing, and means for establishing an actuating pressure to act upon a portion of the actuator piston within the sealing means to overbalance the setting force and expose an increased area of the actuator piston to said actuating pressure, thereby accelerating said thrust column and said first stage, a pair of spacers disposed between said stage members to cooperate therewith to define a coaxial pressure chamber therebetween, one of said spacers being attached to each of the stage members, and means cooperating with the stage members to define an expansible pressure chamber, said chamber being enlarged by relative movement of the stage members, whereby decelerating forces are exerted on said first stage by pressure in said coaxial pressure chamber and by production of a partial vacuum in said expansible chamber.

11. A deceleration device comprising guide means, a stage member slidably mounted relative to said guide means, means cooperating with the stage and the guide means to define an expansible pressure chamber, said chamber being expansible upon movement of the stage, and actuating means for accelerating the stage, said actuating means including cylinder means, an actuator piston positioned in the cylinder means, a thrust column connected with the actuator piston and positioned to move said stage, a plate confronting the actuator piston and defining an orifice, sealing means disposed between the actuator piston and the plate for effecting pressure sealing therebetween about the orifice, means for exerting a setting force urging said actuator piston toward the plate to cover the orifice and effect said pressure sealing, and means for establishing an actuating pressure to act upon a portion of the actuator piston within the sealing means to overbalance the setting force and expose an increased area of the actuator piston to said actuating pressure, thereby accelerating said thrust column and said stage, whereby said pressure chamber is expanded and the pressure therein is reduced to produce a decelerating force on said stage.

References Cited in the file of this patent

UNITED STATES PATENTS

| | | |
|---|---|---|
| 2,204,365 | Klemm | June 11, 1940 |
| 2,364,741 | Merchant | Dec. 12, 1944 |
| 2,517,153 | Wood | Aug. 1, 1950 |
| 2,872,904 | Van Den Beemt | Feb. 10, 1959 |